Sept. 6, 1932.  P. F. SHIVERS  1,875,511

SNAP ACTION MODULATING VALVE

Filed Jan. 22, 1931

Inventor
Paul F. Shivers,

By Hood + Hahn.
Attorneys

Patented Sept. 6, 1932

1,875,511

UNITED STATES PATENT OFFICE

PAUL F. SHIVERS, OF WABASH, INDIANA, ASSIGNOR TO MINNEAPOLIS-HONEYWELL REGULATOR COMPANY, OF MINNEAPOLIS, MINNESOTA, A CORPORATION OF DELAWARE

SNAP-ACTION MODULATING VALVE

Application filed January 22, 1931. Serial No. 510,400.

The object of my invention is to produce a valve structure in which the flow-controlling element will be automatically positioned relative to its seat in response to variations in temperature or pressure conditions at a predetermined point, and in which the initial opening and final closing movements will be comparatively rapid and in the nature of a snap action.

The accompanying drawing illustrates my invention.

Figure 1:
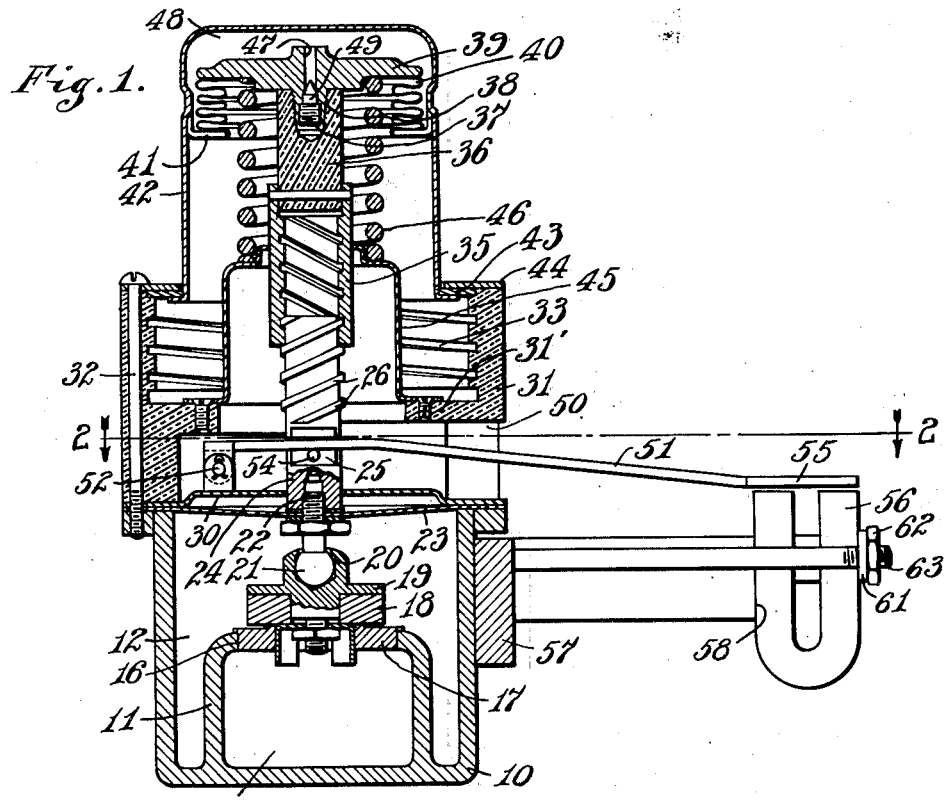

Fig. 1 is an axial section of an embodiment of my invention, and

Figure 2:
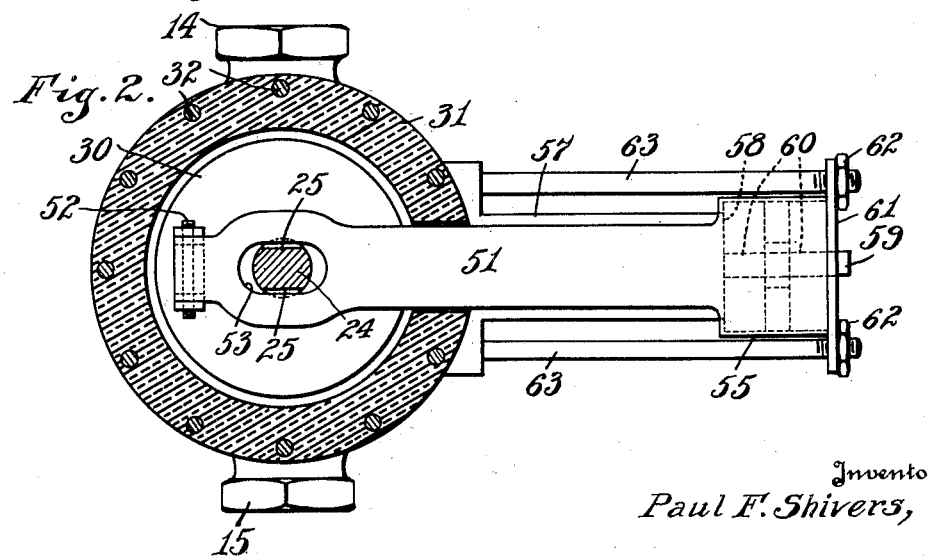

Fig. 2 a section on line 2—2 of Fig. 1.

In the drawing 10 indicates the main hollow body of the valve structure provided with an interior partition 11 dividing the interior of body 10 into an inlet chamber 12 and an outlet chamber 13, inlet 14 communicating with chamber 12 and outlet 15 communicating with chamber 13. Partition 11 is perforated at 16 to receive a valve seat bushing 17.

Seatable upon seat 17 is a valve disc 18 carried by a base disc 19 having a pocket 20 to receive the spherical head 21 of screw 22. Screw 22 is passed through a diaphragm 23 and into a stem 24, clamping the diaphragm between a shouldered portion of the screw and the stem.

A portion of the lower end of stem 24 is flattened as indicated at 25, 25 (Fig. 2), and the upper end of said stem is provided with external screw threads 26.

Diaphragm 23 closes the open end of chamber 12 and is held in position by disc 30 centrally perforated to freely admit stem 24 and so formed as to permit freedom of movement of the middle of the diaphragm.

Disc 30 and diaphragm 23 are held in position by a shell 31 and fastening screws 32 passing through said shell into body 10.

Shell 31 is preferably of heat-insulating material, such for instance as bakelite, and is provided intermediate its length with an inwardly projecting flange 31' through which stem 24 projects. Above flange 31' shell 31 is internally threaded, as indicated at 33, at the same pitch as threads 26. Threaded upon threads 26 is a tubular valve stem section 35 carrying at its upper end a valve stem section 36 preferably of heat-insulating material and having at its upper end an internally-threaded pocket 37 adapted to receive the threaded stud 38 of the bellows head 39 which forms the closure for one end of the pressure bellows 40. The other end of bellows 40 is attached to an annulus 41 of L-shaped cross-section secured within the inverted cup 42 which encases the head 39, bellows 40, and immediately associated parts.

The lower open end of cup 42 is provided with an outwardly extending flange 43 the periphery of which lies in threads 33. A ring 44, held in place by screws 32, normally prevents withdrawal of flange 43 from the threads 33.

A thimble 45, seated on flange 31', forms an abutment for one end of spring 46, the other end of which engages the bellows head 39.

Head 39 is perforated at 47 to facilitate introduction of a volatile fluid into the bellows chamber 48 and this perforation is permanently sealed, after introduction of the volatile fluid, by plug 49.

Below flange 31' shell 31 is chambered at 50 to receive the armature arm 51 which is fulcrumed at 52 upon disc 30 and is perforated at 53 to permit the passage of the lower end of stem 24 therethrough. A diametrical pin 54 carried by stem 24 lies beneath and is engaged by arm 51. The outer end of arm 51 at 55 is of magnetic material and so placed as to be within the field of the magnet 56 when valve disc 18 is closely adjacent seat 17. The magnet 56 may, of course, be of any desired type and is here shown as a permanent magnet which may be held in place relative to armature 55 in any desired manner. In the present drawing a bracket 57, of non-magnetic material, is attached to body 10 and at its outer end is provided with a shoulder 58 and pin 59 passing through perforation 60 in the magnet and the magnet being held in place by a plate 61 held in position by nuts 62 on the threaded ends of pins 63 anchored in the bracket 57.

In operation, increase of pressure within chamber 48 serves, through head 39, to shift valve disc 18 toward its seat 17. The armature arm 51, riding on pin 54, shifts armature 55 toward magnet 56 so that, when disc 18 has approached seat 17 to a point where it is desirable to suddenly close communication between chambers 12 and 13, armature 55 is sufficiently within the field of magnet 56 to be affected thereby to an extent which will exert a force upon the valve stem, at pin 54 supplementing the pressure existing upon head 39, to quickly move disc 18 onto its seat.

Upon sufficient decrease of pressure within chamber 48, spring 46 will suddenly overcome the holding effect of magnet 56 upon armature 55 so that the disc 18 will, in its initial opening movement, be suddenly retracted a short distance from the seat 17, the armature 55 being thereby withdrawn from an effective position within the field of the magnet until returned into that field by reversal of pressure conditions within chamber 48.

Whenever the armature 55 is beyond an effective position relative to the field of the magnet the modulating effect of the pressure chamber 48 upon the valve disc 18 is undisturbed by the magnet but the magnet insures a sudden final closing or sudden initial opening.

The structure is therefore especially useful for the modulated control of a fuel gas.

The shell 31 and stem 36 being of heat-insulating material, the chamber 48 is heat-insulated from the main body 10 so that the operation of the device is not materially affected by temperatures of the main body.

By rotating cup 42 its position axially of the valve stem may be adjusted to adjust the effect of spring 46 upon the bellows so as to adjustably vary the response of the valve disc 18 to changes in pressure in chamber 48. This adjustment of cup 42 does not of itself change the position of disc 18 relative to the valve seat because threads 26 have the same pitch as threads 33.

It will be readily understood that chamber 13 may be the inlet side of the structure without departing from my invention. It will also be understood that distant control of the device may be attained by utilizing the chamber 48 as a vapor pressure chamber receiving vapor pressure through a small tube connected to a volatile liquid-containing capsule arranged at a distant point, in a well-known manner.

I claim as my invention:

1. A modulating valve comprising a hollow main body having communicating inlet and outlet chambers, a movable valve shiftable to vary the communication between said chambers, an expansible and contractible bellows, an axially adjustable abutment for one end of said bellows, a variable length connection between the other end of said bellows and the valve adjustably dependent upon the adjustable bellows abutment, and a spring arranged to have a one-way action upon the valve.

2. A modulating valve comprising a main body having communicating inlet and outlet chambers, a valve arranged to vary the communication between said chambers, a stem for said valve comprising two thread-connected members, a bellows having one end non-rotatively connected to the outer end of said stem, an abutment for the other end of said bellows rotatable about the axis of the valve stem, and a threaded mounting for said abutment coaxial with the stem and of the same pitch as the threaded elements of the stem.

3. A modulating valve of the character specified in claim 1 having heat-insulating elements interposed between the main body and the bellows and between the valve and the bellows.

4. A modulating valve of the character specified in claim 2 wherein the valve stem comprises a heat-insulating portion interposed between the valve and the bellows and wherein there is a heat-insulating element interposed between the main body and the bellows abutment.

5. A modulating valve of the character specified in claim 1 comprising a magnetic armature arranged to act upon the valve and to move therewith, and a magnet so arranged that the armature, when the valve is closely adjacent its closing position, will lie within the effective field of the magnet to be urged thereby in a valve-closing direction.

6. A modulating valve of the character specified in claim 2 comprising a magnetic armature arranged to act upon the valve and to move therewith, and a magnet so arranged that the armature, when the valve is closely adjacent its closing position, will lie within the effective field of the magnet to be urged thereby in a valve-closing direction.

7. A modulating valve comprising a main body having communicating inlet and outlet chambers, a valve arranged to vary the communication between said chambers, pressure-responsive means independent of the flow of fluid through the main body to modulate the position of said valve relative to its seat, a magnetic armature responsive to movements of said valve, and a magnet so arranged relative to said armature that said armature will lie within the effective field of the magnet to be urged in valve-closing direction when the valve is closely adjacent its seat.

8. A valve comprising a main body having communicating inlet and outlet chambers, a diaphragm arranged to form one wall of one of said chambers, a valve arranged to vary the communication between the chambers, a connection between said diaphragm and valve, pressure-responsive means independent of the flow of fluid through the main body and acting through the diaphragm upon said valve to vary the position of said valve relative to its seat, an armature arm arranged to act upon the diaphragm in valve-closing direction and carrying a magnetic armature, and a magnet so arranged relative to said armature that said armature will be within the effective field of the magnet to be urged thereby in valve-closing direction when the valve is closely adjacent its closing position.

9. A modulating valve comprising a main hollow body having communicating inlet and outlet chambers, a diaphragm forming one wall of one of said chambers, a valve carried by said diaphragm and movable therewith to vary the communication between the inlet and outlet chambers of the main body, a stem carried by the outside of said diaphragm and comprising two thread-connected portions, a threaded shell having threads of the same pitch as the threads of the valve stem, connected to the main body, a bellows-containing cup having a threaded engagement with said shell, a connection between said bellows and valve stem, and a spring interposed between the bellows and valve.

10. A modulating valve comprising a main hollow body having communicating inlet and outlet chambers, a diaphragm forming one wall of one of said chambers, a valve carried by said diaphragm and movable therewith to vary the communication between the inlet and outlet chambers of the main body, a stem carried by the outside of said diaphragm and comprising two thread-connected portions, a threaded shell of heat-insulating material, having threads of the same pitch as the threads of the valve stem, connected to the main body, a bellows-containing cup having a threaded engagement with said shell, a connection between said bellows and valve stem with a heat-insulating portion interposed between the bellows and the valve, and a spring interposed between the bellows and valve.

11. A modulating valve of the character specified in claim 10 and embodying an armature arm carrying an armature of magnetic material arranged to act upon the valve stem in valve-closing direction, and a magnet so arranged that said armature will be within the effective field of the magnet to be urged thereby in valve-closing direction when the valve is closely adjacent its closing position.

12. A modulating valve comprising a main body having communicating inlet and outlet chambers, a valve element arranged to control communication between said chambers, means independent of flow of fluid through the main body for automatically modulating the position of said valve element toward and from ultimate flow-obstructing position, and means effective upon the valve when said element is closely adjacent its ultimate flow-obstructing position to urge said valve element toward and yieldingly retain it at its ultimate flow-obstructing position.

13. A modulating valve comprising a main body having communicating inlet and outlet chambers, a valve element arranged to control communication between said chambers, means comprising a pressure-affected element independent of flow of fluid through the main body for automatically modulating the position of said valve element toward and from ultimate flow-obstructing position, and means effective upon the valve when said element is closely adjacent its ultimate flow-obstructing position to urge said valve element toward and yieldingly retain it at its ultimate flow-obstructing position.

14. A modulating valve comprising a main body having communicating inlet and outlet chambers, a valve element arranged to control communication between said chambers, means independent of the flow of fluid through said main body for automatically modulating the position of said valve element toward and from ultimate flow-obstructing position, a magnet, an armature arm arranged to act upon the valve element in closing direction, and an armature carried by said armature arm and movable thereby into the effective field of said magnet when the valve element is closely adjacent its ultimate flow-obstructing position.

15. A modulating valve comprising a main body having communicating inlet and outlet chambers, a valve element arranged to control communication between said chambers, means comprising a pressure-affected element for automatically modulating the position of said valve element toward and from ultimate flow-obstructing position, a magnet, an armature arm arranged to act upon the valve element in closing direction, and an armature carried by said armature arm and movable thereby into the effective field of said magnet when the valve element is closely adjacent its ultimate flow-obstructing position.

In witness whereof, I have hereunto set my hand at Wabash, Indiana, this 13th day of January, A. D. one thousand nine hundred and thirty one.

PAUL F. SHIVERS.